United States Patent

[11] 3,563,435

[72] Inventors Cecil T. Whitehead
Crowthorne;
James E. Wicks, Ashford, England
[21] Appl. No. 774,635
[22] Filed Nov. 12, 1968
[45] Patented Feb. 16, 1971
[73] Assignee International Computers Limited
London, England
a British company
[32] Priority Nov. 15, 1967
[33] Great Britain
[31] 51902/67

[54] TAPE CASSETTES
4 Claims, 1 Drawing Fig.

[52] U.S. Cl. .................. 226/90;
226/118; 179/100.2
[51] Int. Cl. .................. G11b 23/12
[50] Field of Search .................. 226/89, 90,
180, 118, 119; 179/100.2

[56] References Cited
UNITED STATES PATENTS
3,306,510 2/1967 Brumbaugh .................. 226/118
3,340,369 9/1967 Seidl .................. 179/100.2(2)
FOREIGN PATENTS
1,115,947 10/1961 Germany .................. 179/100.2(2)

*Primary Examiner*—Allen N. Knowles
*Attorney*—Hane & Baxley

ABSTRACT: This disclosure relates to a recording tape cassette which is removably mounted on a baseplate assembly, which assembly carries a drive capstan and recording heads. The cassette includes a tape guide means having two concave members separated by a gap at the first corner inside of the boxlike cassette. One concave member extends parallel to a first side of the cassette forming a portion of the tape path. The tape path continues through an opening in the second side of the cassette. A face portion of the second side has mounted thereon a plurality of pressure rollers and pressure pads with the tape traversing the pads and rollers outside the cassette. A tape inlet in the second side is provided such that the tape enters the cassette adjacent a second corner diagonally opposite from the first corner and forms loose folds therein. By engaging the cassette with the baseplate assembly, each pressure pad on the cassette maintains the tape in contact with a corresponding recording head.

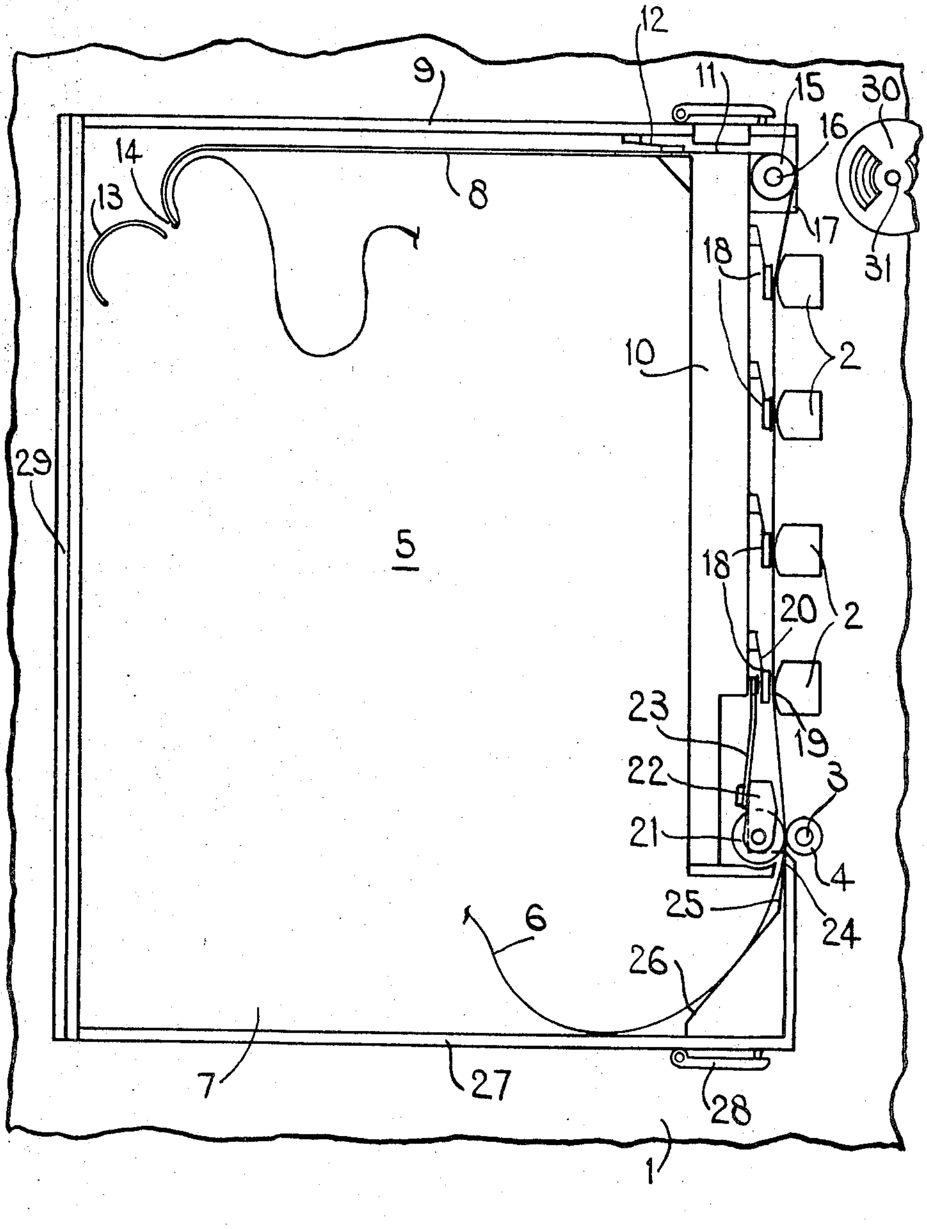
INVENTORS
CECIL THOMAS WHITEHEAD
JAMES EDWARD WICKS
BY Hane and Baxley
ATTORNEYS

TAPE CASSETTES

BACKGROUND OF THE INVENTION

This invention relates to a recording and reproducing device, and in particular to cassettes for holding a length of a tapelike recording medium.

In the past, one of the most common techniques for holding lengths of a recording tape has been the use of reels appropriately mounted in cassettes or containers. While reel-type tape storage devices have the advantage of rapid winding and unwinding speeds, several disadvantages of such devices have been encountered. One such disadvantage is that continued winding of a tape, along with necessary starting and stopping action, imposes a substantial wear, thereby limiting the useful life of the tape. Another disadvantage of reel systems is that when changing tapes, the tape container generally must be opened, the old tape extracted with the new tape reels fitted on mounting posts. Also, the new tape must be threaded past appropriate rollers and recording heads; a step which also adds to the time and effort required to change tapes in a reel-type recording and reproducing device. Thus, when it has been determined that only a limited length of tape is necessary, and it is desirable to easily locate particular points on a recording tape, means other than reels have been proposed for storing or holding such tape.

In order to avoid some of the disadvantages of reel-type cassettes mentioned above, recording devices have been proposed in which tape is stored or held in the form of loose folds in a suitable container. In this type of cassette, however, and endless tape is generally threaded past pressure pads and rollers. When it is necessary to change tapes, the cassette must usually be opened to allow manual threading. Aside from requiring a cassette to have a hinged lid or door, the threading operation can be time consuming. A further disadvantage of endless loop tape recording systems is the possibility of loose folds of tape jamming in an outlet from the tape storage space as the tape is withdrawn from the cassette. In many prior art devices, no specific means to prevent such jamming are provided.

Another disadvantage of previously known cassette devices results from the fact that there are necessarily periods of time in which the recorder is not in use and the tape remains stationery in the cassette. In previous devices in which tape is threaded past a plurality of posts or rollers inside a cassette, permanent deformation or warping of the tape has resulted from the tape being wrapped around such posts for an extensive period of time. Such deformations have been found to add to the likelihood of the tape jamming as it is extracted from the cassette storage space.

Thus, while removably engageable or "plug-in" type tape cassettes have been previously proposed, the prior art reveals a clear need for a removably mounted tape cassette in which an endless tape may be stored without substantial risk of snagging or jamming and in which an old tape may be easily replaced by a new tape.

SUMMARY OF INVENTION

According to the present invention, a removably mounted recording tape cassette includes a boxlike container adapted to hold a length of recording tape arranged in loose folds and means for guiding the tape along a path from a point adjacent a first corner of the container, along a first side of the container, through an opening in a second side of the container, along a face portion of the second side and outside of the container, and into the container through a tape inlet in the second side adjacent a second corner of the container diagonally opposite the first corner.

Also, according to the present invention, pressure rollers and pressure pads are mounted on the face portion of the second side of the boxlike container. A plurality of recording heads are mounted on a baseplate on which the tape cassette is removably mounted. Thus, upon engagement, each pressure pad of the cassette operates to force the tape into contact with a corresponding recording head.

In order to prevent loose folds of tape in the cassette from snagging or jamming as tape is withdrawn, a pair of concave members separated by a gap are provided adjacent a first interior corner of the container. The tape is withdrawn through the gap while the concave members are effective to prevent loose folds from snagging, as is possible in prior art devices. Also, tape is returned through an inlet adjacent a second corner of the container diagonally opposite from the first corner and, with the aid of a ramp positioned in the second corner, tape is easily formed in loose folds. Also, in the present invention, there are no internal posts or rollers so that there is no necessity of threading the tape over such members. Therefore, endless loops may be quickly stored in the cassette and with no internal posts or rollers, as is common in prior art devices, the problem of permanent deformations or warps developing when the recording device is not in use is substantially eliminated.

Furthermore, the present invention allows the tape to be readily changed as a length of tape traverses the entire face portion of the second side of the cassette. The fact that the tape is substantially outside the cassette over the second side thereof allows a sufficient amount of tape for applying a new length when it is necessary to replace a worn tape. Also, by providing the tape outside the cassette over a face portion, the cassette may be mounted on a baseplate so that the tape is engaged by a drive capstan without the necessity of threading the tape past any rollers. Hence, one cassette may be quickly and easily removed and replaced by another when necessary.

BRIEF DESCRIPTION OF THE DRAWING

One embodiment of the invention will now be described with reference to the accompanying drawing in which the sole FIG. shows a diagrammatic plan view of a cassette removably mounted on a recording mechanism.

Referring now to the drawing, the recording mechanism has a main baseplate 1 on which four spaced magnetic heads 2 are mounted. A shaft 3 carries a capstan roller 4. The roller 4 is made preferably of a resilient synthetic plastic material. The shaft 3 is journaled in the baseplate 1 and the lower end of the shaft is coupled to a drive motor through a drive system (not shown) which includes a clutch, so that the capstan roller may be rotated selectively by the drive motor.

A tape cassette 5 is removably mounted on the baseplate 1. The cassette 5 is a substantially rectangular boxlike container, which as shown in the drawing is made of a transparent synthetic plastic material. The cassette contains a closed loop of magnetic tape 6. Top and bottom plates 7 of the cassette are spaced apart by a distance slightly greater than the width of the tape 6, so that the tape is arranged in a number of loose folds within the cassette, the folds resting on edge on the bottom plate of the cassette.

A tape guide plate 8 is mounted within the cassette 5. The major part of the guide plate 8 is parallel to one sidewall 9 of the cassette. One end of the plate 8 is adjacent to a gap 11 in another sidewall 10. The other end of the plate 8 is curved in towards the center of the cassette near to one corner. Thus, the tape 6, may pass from the main body of the cassette, round the curved portion of the plate 8, along the straight portion of the plate and through the gap 11. A pressure pad 12, consisting of a spring carrying a pad of a material such as felt, is mounted on the sidewall 9 and presses the tape against the plate 8 close to the point at which the tape emerges from the cassette through the gap 11. The length of tape between pressure pad 12 and the other end of the plate 8 acts as a 'buffer' to reduce the fluctuations in tape movement which otherwise might result from the unfolding of a fold of the tape as it is drawn over the curved end of the plate 8.

A curved guide plate 13 is mounted close to the curved end of the plate 8 to form a narrow gap 14 through which the tape passes. As the tape passes through the gap 14, any fold in the tape close to the gap tends to move against one or the other of the concave guide surfaces formed by the guide 13 and the curved end of the plate 8. These concave surfaces facilitate the smooth feeding of the tape from the main body of the cassette and prevent the tape kinking or jamming as it passes through the gap 14.

After the tape emerges through the gap 11, it passes round a guide roller 15. The roller is a loose fit on a stub shaft 16 which is mounted on an extension 17 of the bottom plate of the cassette. The tape then passes across the faces of the four magnetic heads 2. Individual pressure pads 18 are mounted on the sidewall 10 to maintain the tape in contact with each of the heads. Each pressure pad consists of a pad 19 of a material such as felt on one end of a flat spring 20. Each spring 20 is mounted at an angle such that in the operative position the face of the pad 19 is parallel to a line joining the faces of the heads 2, so that the tape passes across the heads in a substantially straight line.

The tape then passes between the capstan roller 4 and a pressure roller 21. The roller 21 is free to rotate on a pin mounted on a bracket 22. The bracket 22 is carried by a spring 23 which is mounted on the sidewall 10. The spring 23 urges the roller 21 towards the capstan roller 4, so that when the roller 4 is driven in an anticlockwise direction the tape is fed from right to left as viewed from the head side of the tape. The roller 21 merely serves to keep the tape in contact with the capstan roller 4. It has been found that under some conditions the tape can be fed satisfactorily if the pressure roller assembly is replaced by a simple pressure pad similar to the pressure pads 18 but with a low friction material such as P.T.F.E., commonly known as Polytetrafluoethlene.

The tape reenters the body of the cassette through a gap 24 in the sidewall 10. The tape is guided by ramp surfaces 25 and 26, so that it approaches sidewall 27 of the cassette at a small angle. This ensures that the tape forms loose folds as it moves into the cassette and encounters other folds of the tape. The tape is guided by the surface 26 to a position which is diagonally opposite the gap 14 through which the tape leaves the main body of the cassette. The removal of the tape through the gap 14 tends to produce a general movement of the loose folds of tape across the cassette diagonally from left to right. This prevents an accumulation of tape folds occuring in the area immediately adjacent to the point at which the tape enters the cassette. Such an accumulation is undesirable as it might cause the folds to be squashed so tightly that permanent kinks are produced in the tape.

The cassette is held in the operative position shown in the drawing by clips 28 which are pivotally mounted on the baseplate 1. The cassette may be removed from the baseplate 1 by opening the clips 28 and lifting the back edge of the cassette over retaining flange 29. The cassette may be held in position by other means, such as studs on the cassette which engage with slots in the baseplate.

When the tape becomes worn through use, it may be replaced easily by a new length of tape. A reel 30 of fresh tape is placed on a post 31. The old tape is cut near to the roller 15 and the free end of the fresh tape is attached to the left-hand end of the old tape by a piece of adhesive tape. The capstan roller 4 is driven to feed the tape into the cassette. At the same time, the original tape is pulled slowly out of the cassette by hand. The drive is stopped just before the new tape is fed completely off the reel 30. The old tape is withdrawn from the cassette so that both ends of the new tape are outside the cassette where they can be spliced to form the new tape into a closed loop.

It is desirable that the tape should move freely within the cassette and to this end the sidewalls of the cassette may be provided with a low friction surface. One suitable material is a proprietary tape which is supplied for making light reflecting signals and which has an adhesive coating on one face and a large number of very small glass spheres on the other face. The low friction surface reduces the undesired effects of static charge, produced by movement of the tape, which tends to cause the tape to cling to the sidewalls of the cassette.

It will be appreciated that the tape guide means 8 and 13 need not be constructed in the strip form which has been described, For example, a solid block of material may by formed with the pair of convex guide surfaces on one edge and a channel through the block which follows a path conforming to that which is defined by the plate 8. The radii of the convex and concave guide surfaces need not be the same.

The cassette construction which has been described provides a unitary structure which may be inserted and removed very easily. All the tape guide and pressure means which are required are formed as part of, or carried by, the cassette. This avoids the need for threading the tape through a series of guide and feed rollers each time the cassette is inserted. On the other hand, the capstan roller is mounted on the baseplate, which avoids the need for complex linkages for coupling power to rollers, or other feeding means, on the cassette in itself. It will be appreciated that the cassette may be made as one, or more, plastic mouldings, or it may be made wholly or partially of other materials such as aluminum.

The cassette has been described in connection with magnetic recording tape, but it will be appreciated that it may be used equally well with other tapelike media, such as punched paper tape.

We claim:

1. A tape recording and reproducing apparatus including a baseplate, a rectangular boxlike container removably mounted on the baseplate and holding a length of recording tape arranged in loose folds, first means for guiding said tape from a point adjacent a first corner of the container along a path parallel to the first side of, and within, said container and through an outlet opening in a second side of said container, said first tape guide means including a pair of concave members separated by a gap, said gap being located at said point adjacent the first corner of the container, second means for guiding said tape along a face portion of said second side and past recording and reproducing means mounted on the baseplate, a tape inlet in said second side to allow the tape to reenter said container and third guide means adjacent a second corner of the container diagonally opposite said first corner to assist in producing loose folds in the tape.

2. An apparatus as claimed in claim 1, in which one of said concave members extends parallel to the first side of said container to define a tape path between said point adjacent said first corner and said outlet opening.

3. An apparatus as claimed in claim 1 in which said second guide means includes a plurality of pressure pads and rollers mounted on an external face portion of said second side between said outlet opening and inlet of second side.

4. An apparatus as claimed in claim 1 including a drive capstan mounted on said baseplate, a pressure roller mounted on the face portion of said second side so that the tape outside the container passes between and in contact with said capstan and pressure roller.